UNITED STATES PATENT OFFICE.

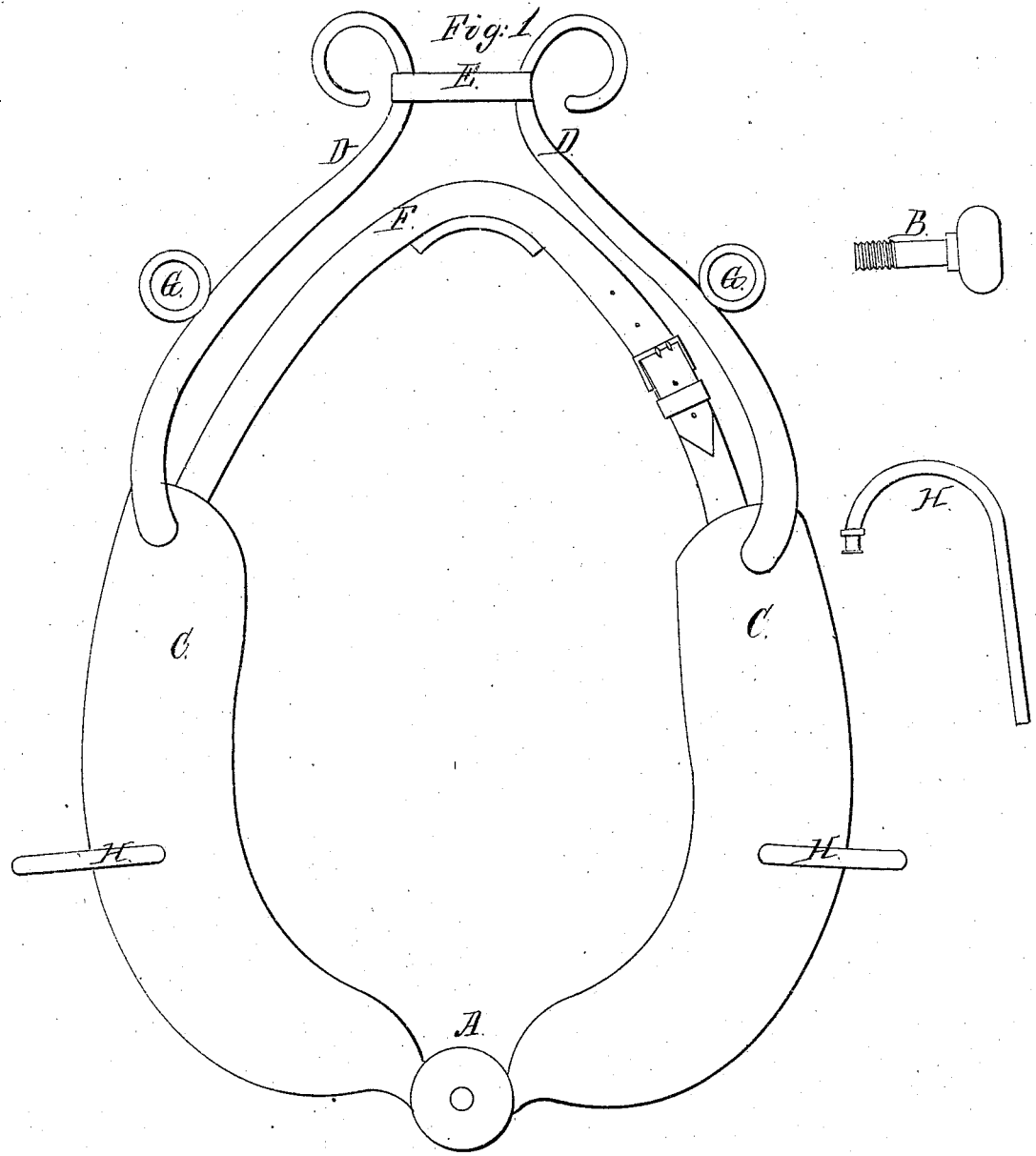

RICHARD RICKEY, OF RUTLAND, OHIO.

HORSE-COLLAR.

Specification of Letters Patent No. 8,517, dated November 11, 1851.

*To all whom it may concern:*

Be it known that I, RICHARD RICKEY, of Rutland, in the county of Meigs and State of Ohio, have invented a new and useful Improvement in the Horse-Collar by which it may be Adjusted to Fit any Sized Horse, so as to Prevent Chafing or Injuring the Animal; and I hereby declare the following to be a full and clear description of the same, reference being had to the accompanying drawings, which drawings constitute a part of said description.

The nature of my improvement consists principally in having two metallic plates so connected by a joint as to open and close with ease and to be secured by two levers which are attached to their upper ends and connected by a strap. These plates constitute the frame or body of the two pads which press on the lower part of the shoulder but do not reach up to the shoulder-blade, see the drawing.

Figure 1 is a front view of the whole.

C, C, are two small pads connected firmly by the joint A. This joint is broad and stout to prevent the collar from being twisted out of shape. These are suspended by the strap F, passing over the horse's neck and may be raised or lowered and at the same time can be brought to any desired width by the two levers D and D which are held together by the strap E, and affords support for the rings for the reins. The bolt B is to confine the joint together.

G and G are the two rings for the bridle reins to pass through.

H, and H, are the arms to which the traces are attached.

The levers D, and D, are so formed as not to touch the horse.

What I claim as my invention and desire to secure by Letters Patent is—

Connecting the sides of the breastplate C by a flat joint A, in combination with the levers D attached to the sides of the breast plate and rising over the neck without touching the shoulders of the animal and connected at the top, by which means the breast plate is made adjustable to the size of the horse substantially as herein set forth.

In testimony whereof I hereto subscribe my name in presence of two witnesses.

R. RICKEY.

Witnesses:
AZA ARNOLD,
I. J. PHILLIPS.